(12) United States Patent
Kester et al.

(10) Patent No.: US 10,429,673 B2
(45) Date of Patent: Oct. 1, 2019

(54) HIGH ENERGY VISIBLE LIGHT ABSORBING MATERIAL FOR OPHTHALMIC SUBSTRATE AND APPLICATION METHOD

(71) Applicant: QUANTUM INNOVATIONS INC., Central Point, OR (US)

(72) Inventors: Norman L. Kester, Rogue River, OR (US); Nicholas M. Hall, Talent, OR (US); Christopher P. VanDerhoff, Medford, OR (US); Richard D. Unbankes, Medford, OR (US)

(73) Assignee: Quantum Innovations, Inc., Central Point, OR (US)

( * ) Notice: Subject to any disclaimer, the term of this patent is extended or adjusted under 35 U.S.C. 154(b) by 98 days.

(21) Appl. No.: 15/832,137

(22) Filed: Dec. 5, 2017

(65) Prior Publication Data

US 2019/0079318 A1 Mar. 14, 2019

Related U.S. Application Data

(60) Provisional application No. 62/557,093, filed on Sep. 11, 2017.

(51) Int. Cl.
*G02C 7/10* (2006.01)
*G02B 1/11* (2015.01)
*B29D 11/00* (2006.01)

(52) U.S. Cl.
CPC ........ *G02C 7/107* (2013.01); *B29D 11/00634* (2013.01); *G02B 1/11* (2013.01); *G02C 7/10* (2013.01); *G02C 7/108* (2013.01); *G02C 2202/06* (2013.01)

(58) Field of Classification Search
USPC .................................. 351/159.49, 59, 6, 65
See application file for complete search history.

(56) References Cited

U.S. PATENT DOCUMENTS

| 5,091,244 A | 2/1992 | Biornard |
| 5,234,561 A | 8/1993 | Randhawa et al. |
| 5,694,240 A | 12/1997 | Sternbergh |
| 5,800,934 A | 9/1998 | Qadri et al. |

(Continued)

FOREIGN PATENT DOCUMENTS

| WO | WO2017077357 | * 5/2017 | ............... G02C 7/10 |
| WO | WO/2017/077357 | 11/2017 | |

*Primary Examiner* — William R Alexander
*Assistant Examiner* — Gary W O'Neill
(74) *Attorney, Agent, or Firm* — Jerry Haynes Law

(57) ABSTRACT

A high energy visible (HEV) light absorbing material and application method for an ophthalmic substrate includes deposition of an HEV light absorbing material onto the ophthalmic substrate. The HEV light absorbing material is applied through physical vapor deposition as a thin layer on ophthalmic substrates for flexibility and color adaptation. The HEV light absorbing material includes at least one of: aluminum zinc oxide, indium zinc oxide and gallium zinc oxide with a material commonly used in the design of antireflective absorbing materials. The HEV light absorbing coating is antireflective and transmits up to 98% of light for the rest of spectrum. The HEV light absorbing material allows the ophthalmic substrate to selectively absorb blue light that falls in the wavelength range of about 400 nm to about 460 nm.

20 Claims, 20 Drawing Sheets

100 ⌐

ABSORPTION

| WAVELENGTH (nm) | SAMPLE A1<br>33 nm IZO (%) | SAMPLE B1<br>65 nm IZO (%) | SAMPLE C1<br>98 nm IZO (%) | SAMPLE D1<br>117 nm IZO (%) | BLANK PG (%) |
|---|---|---|---|---|---|
| 350 | 94.8 | 93.8 | 93.5 | 96.8 | 91.6 |
| 360 | 90.2 | 89.5 | 89.7 | 93.6 | 86.9 |
| 370 | 71.0 | 69.2 | 73.7 | 79.8 | 64.2 |
| 380 | 41.1 | 41.4 | 47.6 | 54.8 | 34.7 |
| 390 | 19.8 | 21.4 | 26.9 | 35.0 | 13.6 |
| 400 | 11.4 | 12.4 | 17.3 | 24.5 | 4.8 |
| 410 | 6.8 | 7.3 | 11.5 | 16.9 | 1.4 |
| 420 | 4.3 | 5.2 | 8.8 | 13.2 | 0.9 |
| 430 | 4.9 | 5.0 | 7.2 | 11.7 | 1.2 |
| 440 | 3.8 | 3.5 | 5.4 | 8.8 | 1.1 |
| 450 | 3.0 | 2.6 | 4.9 | 6.7 | 0.8 |
| 460 | 2.6 | 3.0 | 4.2 | 6.0 | 0.4 |

(56) References Cited

U.S. PATENT DOCUMENTS

| | | | |
|---|---|---|---|
| 6,200,680 B1 | | 3/2001 | Takata et al. |
| 6,517,687 B1 | | 2/2003 | Iacovangelo |
| 7,556,376 B2 | | 7/2009 | Ishak et al. |
| 2009/0211903 A1 | | 8/2009 | Lee et al. |
| 2011/0229660 A1 | | 9/2011 | Reynolds |
| 2016/0324016 A1 | * | 11/2016 | Bellman ............ C03C 17/3417 |
| 2017/0192255 A1 | | 7/2017 | Santan et al. |
| 2018/0321513 A1 | * | 11/2018 | Carrega ................ G02B 5/223 |

* cited by examiner

ABSORPTION

| WAVELENGTH (nm) | SAMPLE A1<br>33 nm IZO (%) | SAMPLE B1<br>65 nm IZO (%) | SAMPLE C1<br>98 nm IZO (%) | SAMPLE D1<br>117 nm IZO (%) | BLANK PG (%) |
|---|---|---|---|---|---|
| 350 | 94.8 | 93.8 | 93.5 | 96.8 | 91.6 |
| 360 | 90.2 | 89.5 | 89.7 | 93.6 | 86.9 |
| 370 | 71.0 | 69.2 | 73.7 | 79.8 | 64.2 |
| 380 | 41.1 | 41.4 | 47.6 | 54.8 | 34.7 |
| 390 | 19.8 | 21.4 | 26.9 | 35.0 | 13.6 |
| 400 | 11.4 | 12.4 | 17.3 | 24.5 | 4.8 |
| 410 | 6.8 | 7.3 | 11.5 | 16.9 | 1.4 |
| 420 | 4.3 | 5.2 | 8.8 | 13.2 | 0.9 |
| 430 | 4.9 | 5.0 | 7.2 | 11.7 | 1.2 |
| 440 | 3.8 | 3.5 | 5.4 | 8.8 | 1.1 |
| 450 | 3.0 | 2.6 | 4.9 | 6.7 | 0.8 |
| 460 | 2.6 | 3.0 | 4.2 | 6.0 | 0.4 |

*FIG. 1A*

| INDICATOR | A1 | A2 | B1 | B2 | C1 | C2 | D1 | D2 |
|---|---|---|---|---|---|---|---|---|
| COATING | SENT. UV | SENT. UV | SENT. UV | SENT. UV | SENT. UV | SENT. UV | SENT. UV | SENT. UV |
| FRONT SIDE IZO THICKNESS | 33 | 33 | 65 | 65 | 98 | 98 | 117 | 117 |
| TRANSMISSION HAZE METER | 96.8 | 96.6 | 96.5 | 97 | 95.2 | 95.1 | 94.5 | 94.4 |

TRANSMISSION

BUILD RECIPE  SAVE COPY  SAVE  CANCEL

SENTINEL UV GREEN IZO  33   GLOW TIME: 10.0sec  ACOAT:  A

| DEPOSITION STEPS/MATERIAL: | THICKNESS (nm) | | RATE (nm/s) | TIME (S) | |
|---|---|---|---|---|---|
| | FRONT | BACK | | FRONT | BACK |
| SIO ADHESION F-B | 5.0 | 5.0 | 1.00 | 5.0 | 5.0 |
| HI F B FAST | 19.0 | 19.0 | 2.00 | 9.5 | 9.5 |
| L OF B | 22.0 | 22.0 | 1.00 | 22.0 | 22.0 |
| HI F B FAST | 65.0 | 65.0 | 2.00 | 32.5 | 32.5 |
| L OF B | 7.0 | 7.0 | 1.00 | 7.0 | 7.0 |
| IZO | 33.0 | 0.0 | 0.33 | 100.0 | 0.0 |
| HI F B FAST | 0.0 | 33.0 | 2.00 | 0.0 | 16.5 |
| L OF B | 75.0 | 75.0 | 1.00 | 75.0 | 75.0 |

HYDRO DESP.  FRONT  BACK   TOTAL: 226.0  226.0   251.0  167.5

BUILD RECIPE  | SAVE COPY | SAVE | CANCEL

SENTINEL UV GREEN IZO  65    GLOW TIME: 10.0sec   ACOAT:  B

| DEPOSITION STEPS/MATERIAL: | THICKNESS (nm) | | RATE (nm/s) | TIME (S) | |
|---|---|---|---|---|---|
| | FRONT | BACK | | FRONT | BACK |
| ➕ SIO ADHESION F-B | 5.0 | 5.0 | 1.00 | 5.0 | 5.0 |
| ➕ HI F B FAST | 19.0 | 19.0 | 2.00 | 9.5 | 9.5 |
| ➕ LO F B | 22.0 | 22.0 | 1.00 | 22.0 | 22.0 |
| ➕ IZO | 45.0 | 0.0 | 0.33 | 136.4 | 0.0 |
| ➕ HI B FAST | 0.0 | 65.0 | 2.00 | 0.0 | 32.5 |
| ➕ LO F B | 8.0 | 8.0 | 1.00 | 8.0 | 8.0 |
| ➕ LO F | 2.0 | 0.0 | 1.00 | 2.0 | 0.0 |
| ➕ HI F B FAST | 33.0 | 33.0 | 2.00 | 16.5 | 16.5 |
| ➕ LO F B | 85.0 | 85.0 | 1.00 | 85.0 | 85.0 |
| ➕ LO F | 10.0 | 0.0 | 1.00 | 10.0 | 0.0 |

HYDRO DESP. FRONT  BACK    TOTAL: 229.0  237.0     294.4  178.5

BUILD RECIPE | SAVE COPY | SAVE | CANCEL

SENTINEL UV GREEN IZO 65 | GLOW TIME: 10.0sec | ACOAT: B

| DEPOSITION STEPS/MATERIAL: | THICKNESS (nm) | | RATE (nm/s) | TIME (S) | |
|---|---|---|---|---|---|
| | FRONT | BACK | | FRONT | BACK |
| SIO ADHESION F-B | 5.0 | 5.0 | 1.00 | 5.0 | 5.0 |
| HI F B FAST | 19.0 | 19.0 | 2.00 | 9.5 | 9.5 |
| LO F B | 22.0 | 22.0 | 1.00 | 22.0 | 22.0 |
| IZO | 45.0 | 0.0 | 0.33 | 136.4 | 0.0 |
| HI B FAST | 0.0 | 65.0 | 2.00 | 0.0 | 32.5 |
| LO F B | 8.0 | 8.0 | 1.00 | 8.0 | 8.0 |
| LO F | 2.0 | 0.0 | 1.00 | 2.0 | 0.0 |
| HI F B FAST | 33.0 | 33.0 | 2.00 | 16.5 | 16.5 |
| LO F B | 85.0 | 85.0 | 1.00 | 85.0 | 85.0 |
| LO F | 10.0 | 0.0 | 1.00 | 10.0 | 0.0 |

HYDRO DESP. FRONT BACK | TOTAL: 229.0 | 237.0 | | 294.4 | 178.5

FIG. 5A

| DEPOSITION STEPS/MATERIAL: | THICKNESS (nm) | | RATE (nm/s) | TIME (S) | |
|---|---|---|---|---|---|
| | FRONT | BACK | | FRONT | BACK |
| SIO ADHESION F-B | 5.0 | 5.0 | 1.00 | 5.0 | 5.0 |
| HI F B FAST | 19.0 | 19.0 | 2.00 | 9.5 | 9.5 |
| LO F B | 22.0 | 22.0 | 1.00 | 22.0 | 22.0 |
| IZO | 55.0 | 0.0 | 0.33 | 166.7 | 0.0 |
| HI B FAST | 0.0 | 65.0 | 2.00 | 0.0 | 32.5 |
| LO F B | 7.0 | 7.0 | 1.00 | 7.0 | 7.0 |
| IZO | 33.0 | 0.0 | 0.33 | 100.0 | 0.0 |
| HI F B FAST | 0.0 | 33.0 | 2.00 | 0.0 | 16.5 |
| LO F B | 75.0 | 75.0 | 1.00 | 75.0 | 75.0 |
| LO F | 5.0 | 0.0 | 1.00 | 5.0 | 0.0 |
| TOTAL: | 229.0 | 237.0 | | 390.2 | 167.5 |

600

BUILD RECIPE — SAVE COPY — SAVE — CANCEL

SENTINEL UV GREEN IZO 65'  GLOW TIME: 10.0sec  ACOAT: C

HYDRO DESP. FRONT BACK

| DEPOSITION STEPS/MATERIAL: | THICKNESS (nm) FRONT | BACK | RATE (nm/s) | TIME (S) FRONT | BACK |
|---|---|---|---|---|---|
| SIO ADHESION F-B | 5.0 | 5.0 | 1.00 | 5.0 | 5.0 |
| IZO | 19.0 | 0.0 | 0.33 | 57.6 | 0.0 |
| HI F B FAST | 0.0 | 19.0 | 2.00 | 0.0 | 9.5 |
| LO F B | 22.0 | 22.0 | 1.00 | 22.0 | 22.0 |
| IZO | 65.5 | 0.0 | 0.33 | 198.5 | 0.0 |
| HI B FAST | 0.0 | 65.0 | 2.00 | 0.0 | 32.5 |
| LO F B | 7.0 | 7.0 | 1.00 | 7.0 | 7.0 |
| IZO | 33.0 | 0.0 | 0.33 | 100.0 | 0.0 |
| HI F B FAST | 0.0 | 33.0 | 2.00 | 0.0 | 16.5 |
| LO F B | 72.0 | 72.0 | 1.00 | 72.0 | 72.0 |
| TOTAL: | 223.5 | 223.0 | | 462.1 | 164.5 |

SENTINEL UV GREEN IZO117  GLOW TIME: 10.0sec  ACOAT: ALL

BUILD RECIPE — SAVE COPY — SAVE — CANCEL

HYDRO DESP. FRONT BACK

700

HIGH ENERGY VISIBLE LIGHT ABSORBING MATERIAL FOR OPHTHALMIC SUBSTRATE AND APPLICATION METHOD

CROSS-REFERENCE TO RELATED APPLICATIONS

This application claims the benefit of U.S. provisional application No. 62/557,093, filed Sep. 11, 2017 and entitled HIGH ENERGY VISIBLE LIGHT ABSORBING MATERIAL FOR OPTHALMIC SUBSTRATE, which provisional application is hereby incorporated by reference herein in its entirety.

FIELD OF THE INVENTION

The present invention relates generally to a high energy visible light (HEV) absorbing material for optical coatings and a method of application typically through physical vapor deposition. More so, the present invention relates to an HEV light absorbing material that may be applied typically through physical vapor deposition (PVD) to an optical coating on an ophthalmic substrate to selectively absorb light within the wavelength range of about 400 nm to about 460 nm; and comprising at least one of an aluminum zinc oxide, indium zinc oxide and gallium zinc oxide; and whereby the coating is antireflective and transmits up to 98% of light for the rest of the light spectrum, so as to reduce the flux of blue light to the internal structures of the eye while reducing or minimizing dilation of the pupil and giving some protection in the UV 350-400 nm range by absorbing a percentage light.

SUMMARY OF THE INVENTION

The disclosure is generally directed to a high energy visible light absorbing coating for an ophthalmic substrate. An illustrative embodiment of the substrate coating includes a high energy visible light absorbing material comprising at least one of the following: aluminum zinc oxide, indium zinc oxide and gallium zinc oxide, the high energy visible light absorbing material selectively absorbing light within a wavelength range of the light spectrum of between about 350 nm and about 460 nm, the high energy visible light absorbing material enabling transmission of at least 98 percent of light outside the wavelength range of the light spectrum of between about 350 nm and about 460 nm, the high energy visible light absorbing material further being generally antireflective.

An alternative embodiment of the disclosure includes a high energy visible light absorbing coating for an ophthalmic substrate. The substrate coating includes a high energy visible light absorbing material comprising at least one of the following: aluminum zinc oxide, indium zinc oxide or gallium zinc oxide, the high energy visible light absorbing material selectively absorbing light within a wavelength range of the light spectrum of between about 400 nm and about 460 nm, the high energy visible light absorbing material enabling transmission of at least 98 percent of light outside the wavelength range of the light spectrum of between about 350 nm and about 460 nm, the high energy visible light absorbing material further being generally antireflective.

An alternative embodiment of the disclosure includes an application method for a high energy visible light absorbing material. The application method includes providing a high energy visible light absorbing material having at least one of the following: aluminum zinc oxide, indium zinc oxide and gallium zinc oxide; providing an ophthalmic substrate; applying the high energy visible light absorbing material to the ophthalmic substrate; and forming a high energy visible light absorbing coating on the ophthalmic substrate by curing the high energy light absorbing material, the high energy visible light absorbing coating selectively absorbing light within a wavelength range of the light spectrum of between about 350 nm and about 460 nm, the high energy visible light absorbing coating enabling transmission of at least 98 percent of light outside the wavelength range of the light spectrum of between about 350 nm and about 460 nm.

BRIEF DESCRIPTION OF THE DRAWINGS

The invention will now be described, by way of example, with reference to the accompanying drawings, in which:

FIG. 1A illustrates a Table referencing absorption of light by exemplary optical coatings of the HEV light absorbing material with specified thicknesses, in accordance with an illustrative embodiment of the present invention;

FIG. 1B illustrates a Table referencing transmission of light through an exemplary thickness of HEV light absorbing material, present in the optical coating, in accordance with an illustrative embodiment of the present invention;

FIG. 2 illustrates a typical screen shot of a user interface on an exemplary physical vapor deposition computer system for controlling the application of an HEV light absorbing coating on an ophthalmic substrate, in accordance with an illustrative embodiment of the present invention;

FIG. 3A illustrates a first system digital display of a typical screen shot of a user interface on an exemplary physical vapor deposition computer system for controlling deposition of an HEV light absorbing coating on an ophthalmic substrate, in accordance with an illustrative embodiment of the present invention;

FIG. 4A illustrates a second system digital display of a typical screen shot of a user interface on an exemplary physical vapor deposition computer system for controlling deposition of an HEV light absorbing coating on an ophthalmic substrate;

FIG. 5A illustrates a third system digital display of a typical screen shot of a user interface on an exemplary physical vapor deposition computer system for controlling deposition of an HEV light absorbing coating on an ophthalmic substrate;

FIG. 6A illustrates a fourth system digital display of a typical screen shot of a user interface on an exemplary physical vapor deposition computer system for controlling deposition of an HEV light absorbing coating on an ophthalmic substrate;

FIG. 7A illustrates a fifth system digital display of a typical screen shot of a user interface on an exemplary physical vapor deposition computer system for controlling deposition of an HEV light absorbing coating on an ophthalmic substrate, in accordance with an illustrative embodiment of the present invention;

Like reference numerals refer to like parts throughout the various views of the drawings.

DETAILED DESCRIPTION OF THE INVENTION

Figure 3B:
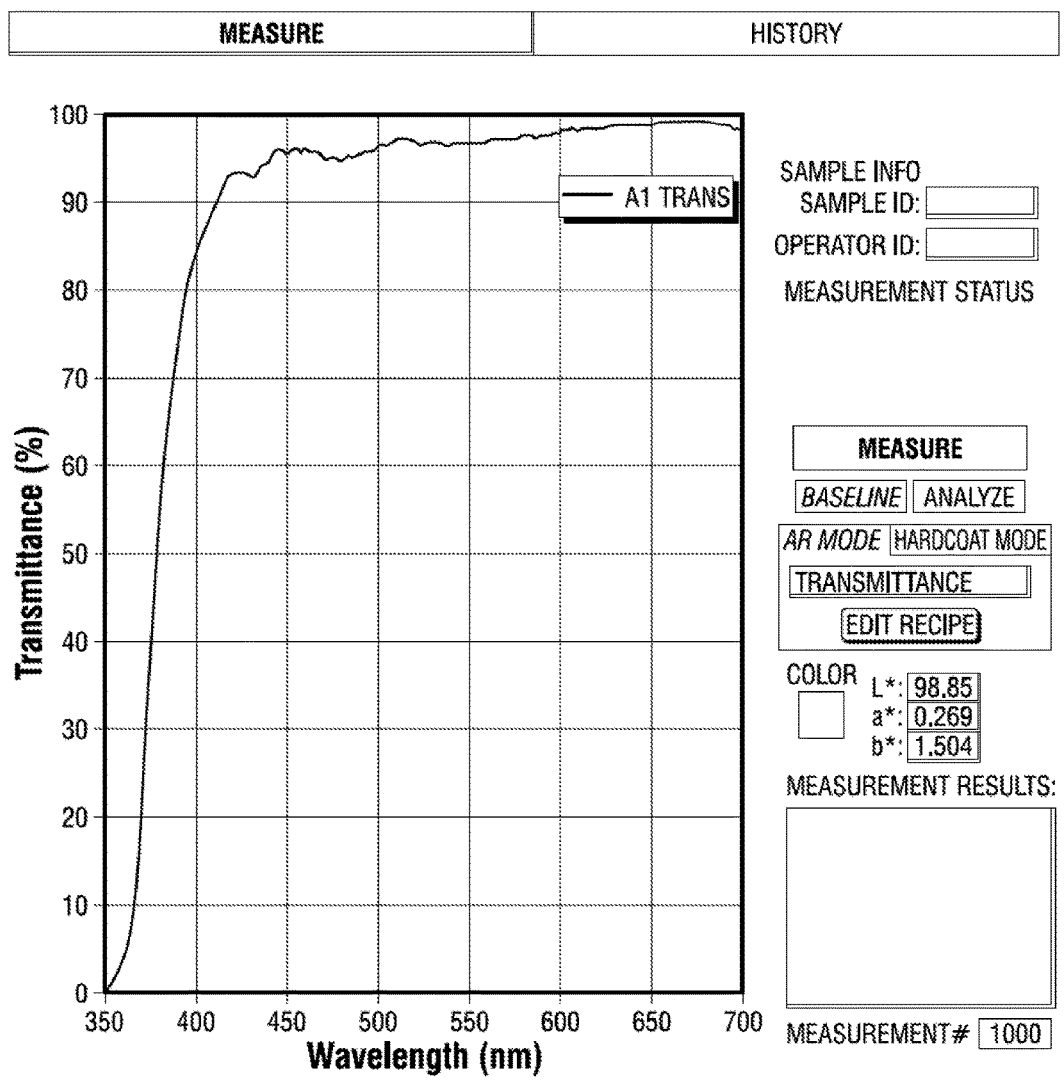
FIG. 3B illustrates a light transmission spectrum chart on which is plotted a baseline AR light spectrum having a wavelength from 350 to 750 nm versus % Reflectance of light waves, in accordance with an illustrative embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1A. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Referring initially to FIGS. 8A-8E of the drawings, a high energy visible (HEV) light absorbing material 104 for an HEV light absorbing coating 102 and method of application thereof through physical vapor deposition is illustrated. The high energy visible light (HEV) absorbing coating 102 may be deposited onto at least one surface of an ophthalmic substrate 106 such as an optical lens, for example and without limitation. In some embodiments, the HEV light absorbing coating 102 may be applied to the ophthalmic substrate 106 through physical vapor deposition (PVD) techniques which may be standard or conventional. The HEV light absorbing material 104 may be applied as a thin layer to form the HEV light absorbing coating 102 on a wide variety of ophthalmic substrates 106. The HEV light absorbing coating 102 may allow for greater flexibility and color adaptations of the ophthalmic substrate 106. Furthermore, the HEV light absorbing material 104 may be applied as a single layer or multiple layers as the HEV light absorbing coating 102 and accomplish the absorption without addition to a conventional antireflective absorbing material known by those skilled in the art.

The composition that makes up the HEV light absorbing material 104 may include addition of at least one of the following: aluminum zinc oxide, indium zinc oxide and gallium zinc oxide. The HEV light absorbing coating 102 may be antireflective and may transmit up to 98% of light for the rest of the visible light spectrum. The HEV light absorbing coating 102 may allow the ophthalmic substrate 106 to selectively absorb blue light that falls in the wavelength range of about 400 nm and about 460 nm. In this manner, to a human observer, the flux of blue light to the internal structures of the eye is reduced and dilation of the pupil is minimized.

One aspect of a high energy visible light absorbing coating 102 for an ophthalmic substrate 106, comprises: an HEV light absorbing material 104 comprising at least one of the following: aluminum zinc oxide, indium zinc oxide and gallium zinc oxide which may be added to an antireflective coating comprising $SiO_2$, $MgF_2$, $ZrO_2$, $TiO_2$, $Ta_3O_5$, and other chemical elements and/or compounds commonly used in the design of antireflective coatings, the HEV light absorbing coating 102 selectively absorbing light within a wavelength range of between about 400 nanometers and about 460 nanometers, the HEV light absorbing coating 102 enabling transmission of at least 98 percent of light from the light spectrum outside the wavelength of about 400 nanometers and about 460 nanometers, the HEV light absorbing coating 102 further being generally antireflective.

In another aspect, the HEV light absorbing coating 102 may be applied to the ophthalmic substrate 106 through physical vapor deposition techniques.

In another aspect, the physical vapor deposition techniques may include known methods of magnetron sputtering, e-beam evaporation and thermal evaporation.

One objective of the present invention is to provide superior protection from harmful effects by absorbing HEV light through use of an HEV light absorbing material 104 comprising at least one of the following: aluminum zinc oxide, indium zinc oxide, gallium zinc oxide and at least one chemical element and/or compound commonly used in the design of antireflective absorbing materials.

Another objective is to control the quantity of aluminum zinc oxide, indium zinc oxide, gallium zinc oxide, $SiO_2$, $MgF_2$, $ZrO_2$, $TiO_2$, $Ta_3O_5$, and at least one chemical element and/or compound commonly used in the design of antireflective absorbing materials, so as to create tunable absorption of light.

Another objective is to provide a thin HEV light absorbing material 104 that is sufficiently flexible to be easily applied to different types of ophthalmic substrates 106.

Another objective is to provide an optimized HEV light absorbing coating 102 such as an antireflective HEV light absorbing coating 102 for ophthalmic lenses or a wavelength-specific attenuator for cell phones without negative cosmetic effects or alarm to other wavelengths.

Another objective is to provide an HEV light absorbing coating 102 on an ophthalmic substrate 106 that can be worn at all times.

Another objective is to provide an HEV light absorbing coating 102 on an ophthalmic substrate 106 that can reduce glare and reflections from computer screens for a wearer.

Yet another objective is to provide an HEV light absorbing coating 102 on an ophthalmic substrate 106 which can reduce digital eye strain and associated symptoms such as blurred vision, eye fatigue, headaches, dry eyes and sleep disruption, for example and without limitation, for a wearer.

Yet another objective is to provide an HEV light absorbing coating 102 on an ophthalmic substrate 106 which prevents or reduces the risk of macular degeneration and deterioration of the central portion of the retina for a wearer.

The HEV light absorbing coating 102 may be configured to selectively absorb blue light that falls within the wavelength range of about 350 nm and about 460 nm, and typically, about 400 nm and about 460 nm. Absorption of wavelengths in this range may help reduce the phototoxic light penetrating the eye of the wearer while still providing phototropic vision to the eye.

The HEV light absorbing material 104 may be deposited onto any type of ophthalmic substrate 106 known in the art of optical lens substrates. In some embodiments, the ophthalmic substrate 106 may include, without limitation, an optical lens, an LED screen, or a camera lens. The HEV light absorbing material 104 may be applied thinly to the ophthalmic substrate 106 so as to allow for flexibility and use with eclectic types of ophthalmic lenses. The HEV light absorbing coating 102 may be sufficiently thin so as to be flexible for easy application to different types of ophthalmic substrates 106. This expedient may facilitate coating of different types of ophthalmic substrates 106 and may also enable an ophthalmic device of which the ophthalmic substrate 106 is a part to be easily worn at all times.

In some embodiments, the HEV light absorbing material 104 that will form the HEV light absorbing coating 102 may be applied to at least one surface of the ophthalmic substrate 106 through physical vapor deposition techniques. In some embodiments, the physical vapor deposition techniques may include magnetron sputtering and e-beam evaporation means known in the art. In other embodiments, the physical vapor deposition techniques may include a physical or chemical vapor, corona method or thermal evaporation deposition system and method which facilitate sequential application of the HEV light absorbing material 104 to the ophthalmic substrate 106 by gravity-actuated transfer of the ophthalmic substrates 106 between successive deposition chambers (not illustrated).

Figure 8A:
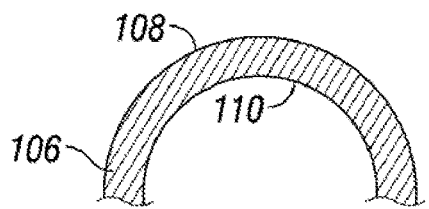
FIG. 8A is a cross-sectional view of a typical ophthalmic substrate prior to application of the HEV light absorbing material on the substrate in accordance with an illustrative embodiment of the present invention.
Figure 8B:
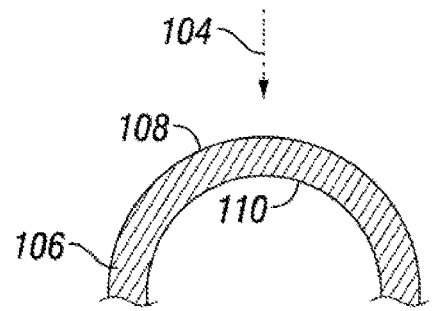
FIG. 8B is a cross-sectional view of the ophthalmic substrate illustrating application of the HEV light absorbing material on the ophthalmic substrate in accordance with an illustrative embodiment of the present invention.
Figure 8C:
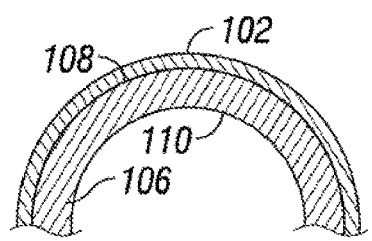
FIG. 8C is a cross-sectional view of the ophthalmic substrate with the HEV light absorbing coating on an exterior surface of the ophthalmic substrate in accordance with an illustrative embodiment of the present invention.
Figure 8D:
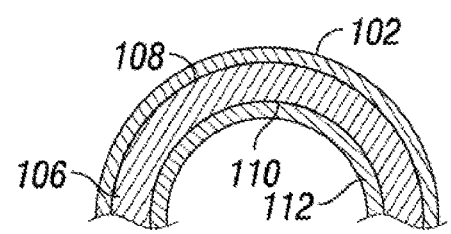
FIG. 8D is a cross-sectional view of the ophthalmic substrate with HEV light absorbing coatings on respective exterior and interior surfaces of the ophthalmic substrate.
Figure 8E:
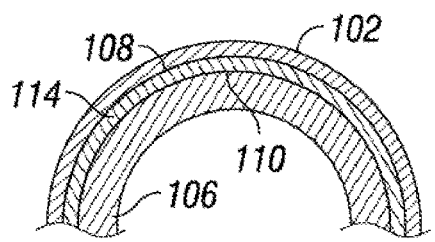
FIG. 8E is a cross-sectional view of the ophthalmic substrate with the HEV light absorbing coating on an antireflective coating which was previously applied to the ophthalmic substrate.

As illustrated in FIGS. 8A-8E, in some embodiments, the HEV light absorbing material 104 may be applied to the ophthalmic substrate 106 to form an HEV light absorbing coating 102 on an exterior substrate surface 108. In other embodiments, the HEV light absorbing material 104 may be applied to the ophthalmic substrate 106 to form an HEV light absorbing coating 102 on an interior substrate surface 110 of the ophthalmic substrate 106. As illustrated in FIG. 8D, in still other embodiments, the HEV light absorbing material 104 may be applied to the ophthalmic substrate 106 to form an HEV light absorbing coating 102 on both an exterior substrate surface 108 and an interior substrate surface 110. As illustrated in FIG. 8E, in some embodiments, the HEV light absorbing material 102 may be applied to an antireflective coating 114 which was previously applied to the ophthalmic substrate 106. In other embodiments, the HEV light absorbing material 104 may be combined with chemical elements and/or compounds which are commonly used in the design of antireflective coatings prior to application of the HEV light absorbing material 104 to the ophthalmic substrate 106 to render the HEV light absorbing coating 102 antireflective.

The composition of the HEV light absorbing coating 102 may include at least one of indium zinc oxide, aluminum zinc oxide and gallium zinc oxide which may be added to chemical elements and/or compounds which may be used in the formulation of conventional antireflective coating materials. The antireflective coating materials may include at least one of the following: $SiO_2$, $MgF_2$, $ZrO_2$, $TiO_2$, and $Ta_3O_5$. The indium zinc oxide, aluminum zinc oxide and/or gallium zinc oxide in the HEV light absorbing coating 102 may allow the ophthalmic substrate 106 to attenuate the light between about 400 nm and about 460 nm wavelengths.

In some embodiments, the HEV light absorbing material 104 which will form the HEV light absorbing coating 102 may be deposited onto the ophthalmic substrate 106 as a thin film.

Referring next to FIG. 1A of the drawings, the absorption Table 100 shows that the thickness of the HEV light absorbing material 104 within the HEV light absorbing coating 102 may be determinative of the amount of blue light that is absorbed by the ophthalmic substrate 106.

Sample A1 in FIG. 1A shows that, at a thickness of 33 nm for the HEV light absorbing coating 102, the absorption of light at 400 nm is 11.4%. The transmission of all light for sample A1 is 96.6%.

Sample B1 in FIG. 1A shows that, at a thickness of 65 nm for the HEV light absorbing coating 102, the absorption of light at 400 nm is 12.4%. The transmission of all light for sample B1 is 96.5%.

Sample C1 in FIG. 1A shows that, at a thickness of 98 nm for the HEV light absorbing coating 102, the absorption of light at 400 nm is 17.3% transmission of all light for sample C1 is 95.1%.

Sample D1 in FIG. 1A shows that, at a thickness of 117 nm for the HEV light absorbing coating 102, absorption of blue light at 400 nm is 24.5%. The transmission of all light for sample D1 is 94.4%.

In some embodiments, the HEV light absorbing coating 102 may be antireflective and may transmit up to 98% of light for the rest of the light spectrum outside the 400 to 460 nm wavelengths. In essence, when implemented on an ophthalmic device donned by a wearer, the HEV light absorbing coating 102 may block blue light that is emitted from digital displays to relieve the eyes of the wearer. Specifically, the HEV light absorbing coating 102 may help protect the human retina from phototoxic blue light by preventing dilation of the pupil which acts to increase blue and other photon flux to the macula.

Referring next to FIG. 1B of the drawings, the transmission Table 105 shows sample transmission of light through the HEV light absorbing coating 102. The thickness of the HEV light absorbing coating 102 is determinative of the amount of blue light that is transmitted through the ophthalmic substrate 106.

Sample A1 in FIG. 1B references the front side thickness of the HEV light absorbing material 104 which is present in the HEV light absorbing coating 102 at a coating thickness of 33 nanometers. The HEV light absorbing coating 102 facilitates a 96.8% transmission of light. Sample A2 in FIG. 1B references the front side thickness of the HEV light absorbing material 104 which is present in the HEV light absorbing coating 102 at 33 nm. The HEV light absorbing coating 102 facilitates a 96.6% transmission of light.

Sample B1 in FIG. 1B references the front side thickness of the HEV light absorbing material 104 which is present in the HEV light absorbing coating 102 at a coating thickness of 65 nanometers. The HEV light absorbing coating 102 facilitates a 96.5% transmission of light. Sample B2 in FIG. 1B references the front side thickness of the HEV light absorbing material 104 which is present in the HEV light absorbing coating 102 at a coating thickness of 65 nanometers. The HEV light absorbing coating 102 facilitates a 97% transmission of light.

Sample C1 in FIG. 1B references the front side thickness of the HEV light absorbing material 104 which is present in the HEV light absorbing coating 102 at a coating thickness of 98 nanometers. The HEV light absorbing coating 102 facilitates a 95.2% transmission of light. Sample C2 in FIG. 1B references the front side thickness of the HEV light absorbing material 104 which is present in the HEV light absorbing coating 102 at a coating thickness of 98 nanometers. The HEV light absorbing coating 102 facilitates a 95.1% transmission of light.

Sample D1 in FIG. 1B references the front side thickness of the HEV light absorbing material 104 which is present in the HEV light absorbing coating 102 at a coating thickness of 117 nanometers. The HEV light absorbing coating 102 facilitates a 94.5% transmission of light. Sample D2 in FIG. 1B references the front side thickness of the HEV light absorbing material 104 which is present in the HEV light absorbing coating 102 at 117 nanometers. The HEV light absorbing coating 102 facilitates a 94.4% transmission of light.

Figure 2:
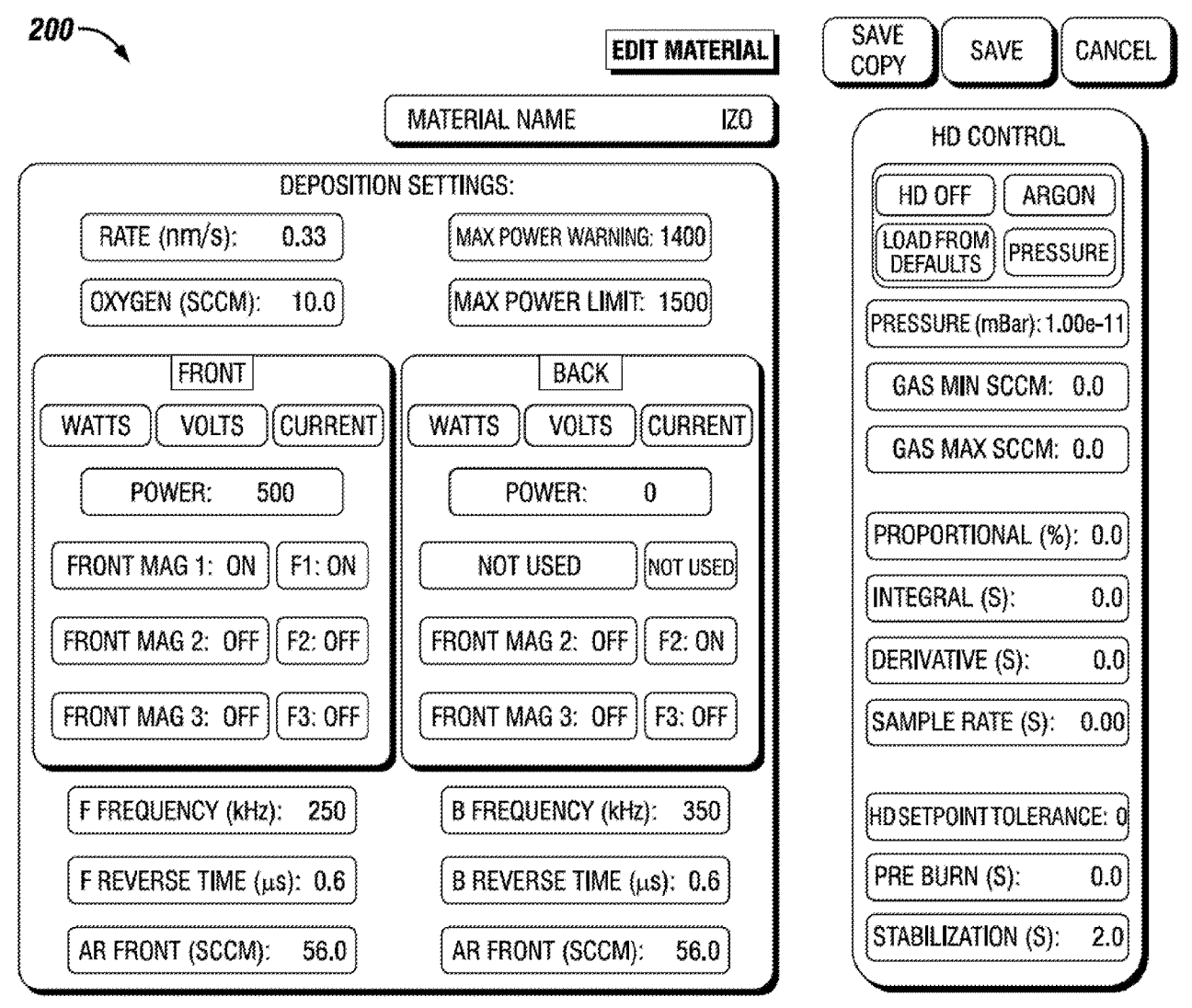

FIG. 2 of the drawings illustrates a typical screen shot 200 of a user interface on an exemplary physical vapor deposition computer system for controlling the application of an HEV light absorbing material 104 on an ophthalmic substrate, in accordance with an illustrative embodiment of the present invention. The system 200 may provide a computer file for programming, storing, and controlling application of the HEV light absorbing material 104 onto the ophthalmic substrate 106. The computer file may include a graphic digital display which shows various control settings which are visible to optimize application of the HEV light absorbing material 104, including but not limited to deposition settings, power settings and temperature control. In some embodiments, the system may provide a material file which contains deposition parameters in the Fusion M, built with a Pfeiffer turbo-molecular pump that is graphical and user friendly and known by those skilled in the art.

It is evident that as the amount of HEV light absorbing material 104 which is deposited onto the ophthalmic substrate 106 increases, the amount of blue light transmission decreases, so as to controllably attenuate the HEV light. The absorption of blue light is illustrated graphically as light transmission spectrums and shown in FIGS. 3A-7C. These light transmission spectrums correlate to absorption Table 100 shown in FIG. 1A.

FIG. 3A of the drawings is a depiction of the first system digital display 300 for controlling Samples A1 and A2, showing the thickness of application of HEV light absorbing material 104 on both the front and rear side of the ophthalmic substrate. The steps of deposition are listed in real time. The rate at which the HEV light absorbing material 104 is applied is also shown. The light transmission spectrum 302 shown in FIG. 3B references the baseline AR light spectrum, the X-axis for wavelength from 350 to 750 nm, and the Y-axis for the % Reflectance of light waves, and specifically blue light waves between 400 nm to 460 nm. The light transmission spectrum 304 shown in FIG. 3C references the baseline AR light spectrum, the X-axis for wavelength from 350 to 750 nm, and the Y-axis for the % Transmittance of light waves, and specifically blue light waves between 400 nm to 460 nm. As shown in Table 100, transmission of all light 96.6% to 96.8%.

The first system digital display 300 shown in FIG. 3A illustrates a typical screen shot of a user interface on an exemplary physical vapor deposition computer system for controlling deposition of HEV light absorbing material 104 on an ophthalmic substrate for controlling Samples A1 and A2, showing the thickness of application of HEV light absorbing material 104 on both the front and rear sides of the ophthalmic substrate 106. The steps of deposition are listed in real time. The rate at which the HEV light absorbing material 104 is applied is also shown.

FIG. 3B of the drawings illustrates a light transmission spectrum chart 302 on which is plotted a baseline AR light spectrum having a wavelength from 350 to 750 nm versus Reflectance of light waves, in accordance with an illustrative embodiment of the present invention. The light transmission spectrum chart 302 shown in FIG. 3B references the baseline AR light spectrum, the X-axis for wavelength from 350 to 750 nm, and the Y-axis for the % Reflectance of light waves, and specifically blue light waves between 400 to 460 nm.

Figure 3C:
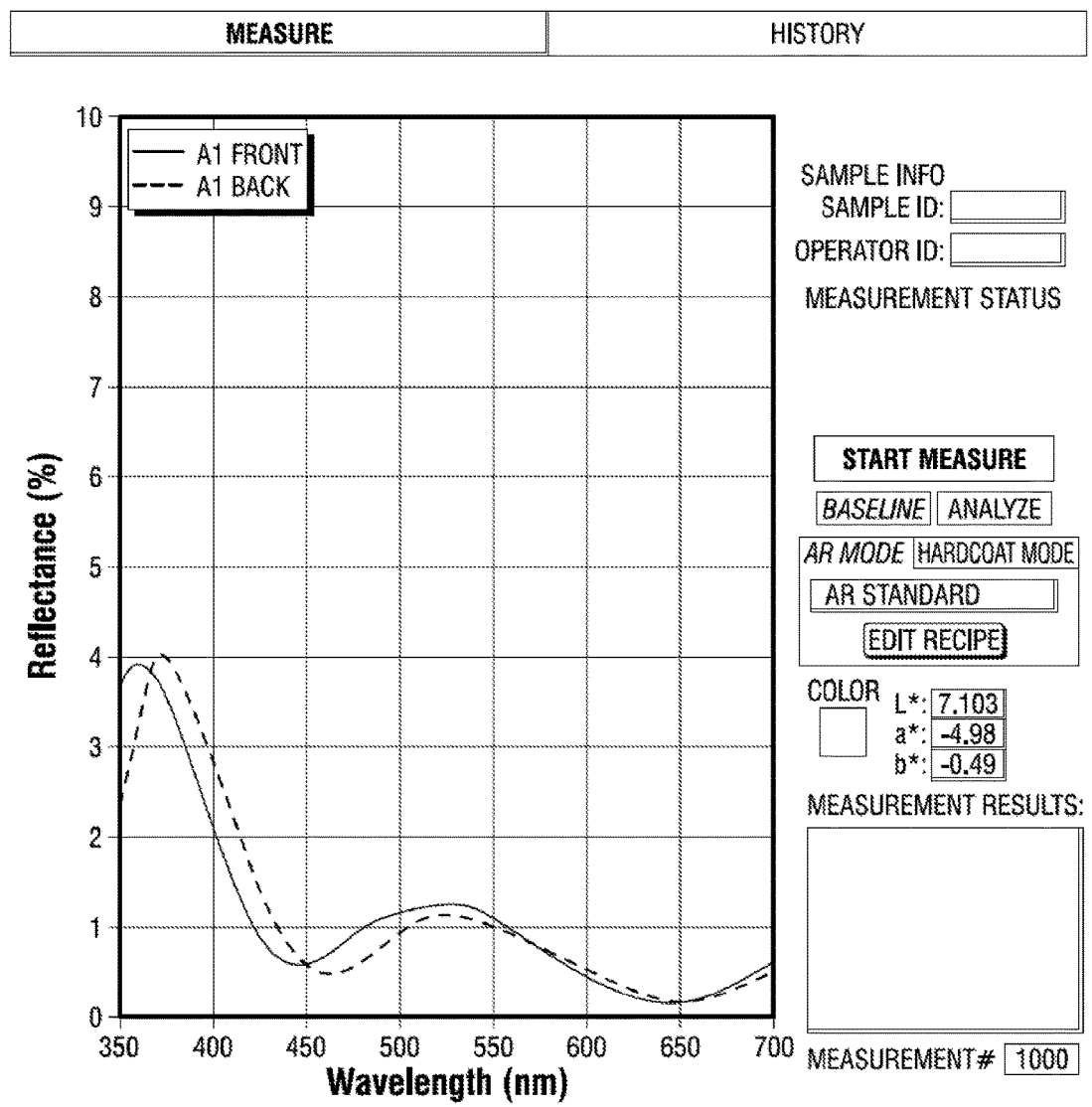
FIG. 3C illustrates a light transmission spectrum chart on which is plotted a baseline AR light spectrum having a wavelength from 350 to 750 nm versus % Transmittance of light waves, in accordance with an illustrative embodiment of the present invention.

FIG. 3C of the drawings illustrates a light transmission spectrum chart 304 on which is plotted a baseline AR light spectrum having a wavelength from 350 to 750 nm versus %

Transmittance of light waves, in accordance with an illustrative embodiment of the present invention. The light transmission spectrum chart 304 shown in FIG. 3C references the baseline AR light spectrum, the X-axis for wavelength from 350 to 750 nm, and the Y-axis for the % Transmittance of light waves, and specifically blue light waves between 400 to 460 nm. As shown in Table 100 (FIG. 1A), the absorption of light at 400 nm is 11.4%, whereas the transmission of all light is 96.6%.

Figure 4B:
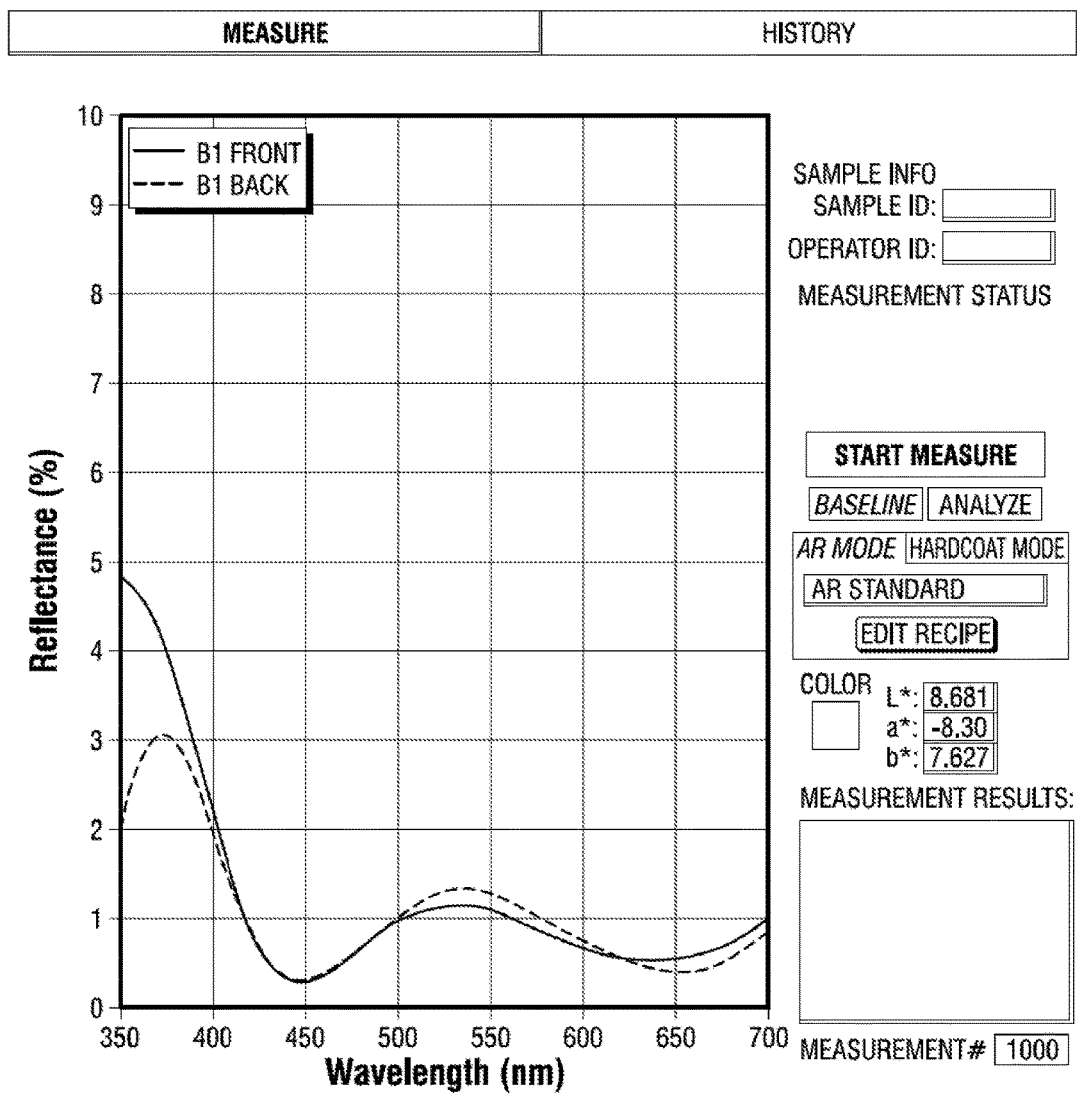
FIG. 4B illustrates a light transmission spectrum chart on which is plotted a baseline AR light spectrum having a wavelength from 350 to 750 nm versus % Reflectance of light waves, in accordance with an illustrative embodiment of the present invention.

FIG. 4A of the drawings is a depiction of the system digital display 400 for controlling Samples B1 and B2, showing the thickness of application of HEV light absorbing material 104 on both the front and rear side of the ophthalmic substrate 106. The steps of deposition are listed in real time. The rate at which the HEV light absorbing material 104 is applied on the ophthalmic substrate 106 is also shown. The light transmission spectrum chart 402 shown in FIG. 4B references the baseline AR light spectrum, the X-axis for wavelength from 350 to 750 nm, and the Y-axis for the % Reflectance of light waves, and specifically blue light waves between about 400 nm and about 460 nm.

Figure 4C:
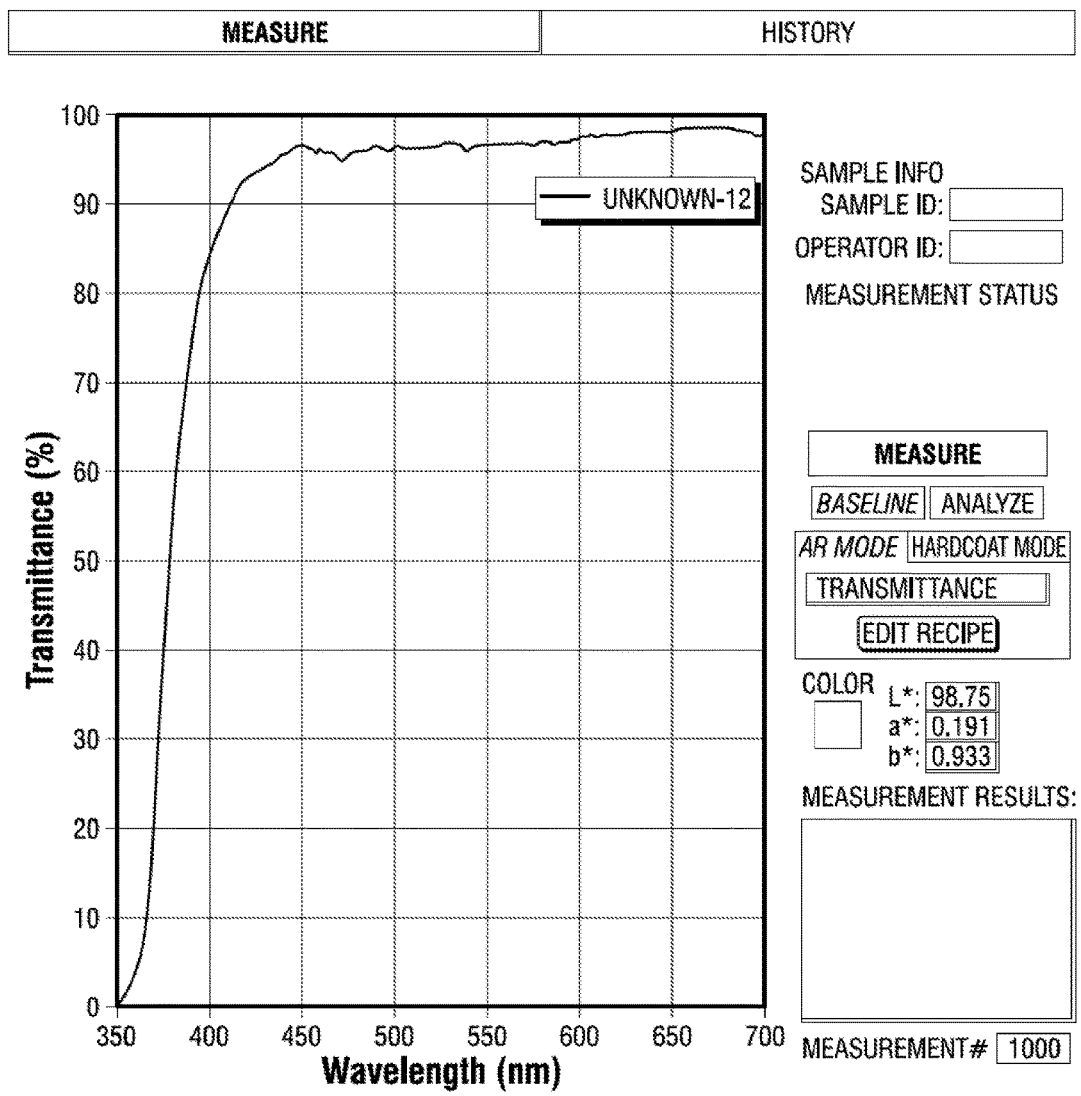
FIG. 4C illustrates a light transmission spectrum chart on which is plotted a baseline AR light spectrum having a wavelength from 350 to 750 nm versus % Transmittance of light waves, in accordance with an illustrative embodiment of the present invention.

FIG. 4C of the drawings illustrates a light transmission spectrum chart 404 on which is plotted a baseline AR light spectrum having a wavelength from 350 to 750 nm versus Transmittance of light waves, in accordance with an illustrative embodiment of the present invention. The light transmission spectrum chart 404 shown in FIG. 4C references the baseline AR light spectrum, the X-axis for wavelength from 350 to 750 nm, and the Y-axis for the % Transmittance of light waves, and specifically blue light waves between about 400 nm and about 460 nm. As shown in Table 100, the absorption of light at 400 is 12.4%, whereas the transmission of all light is 96.5%.

Figure 5B:
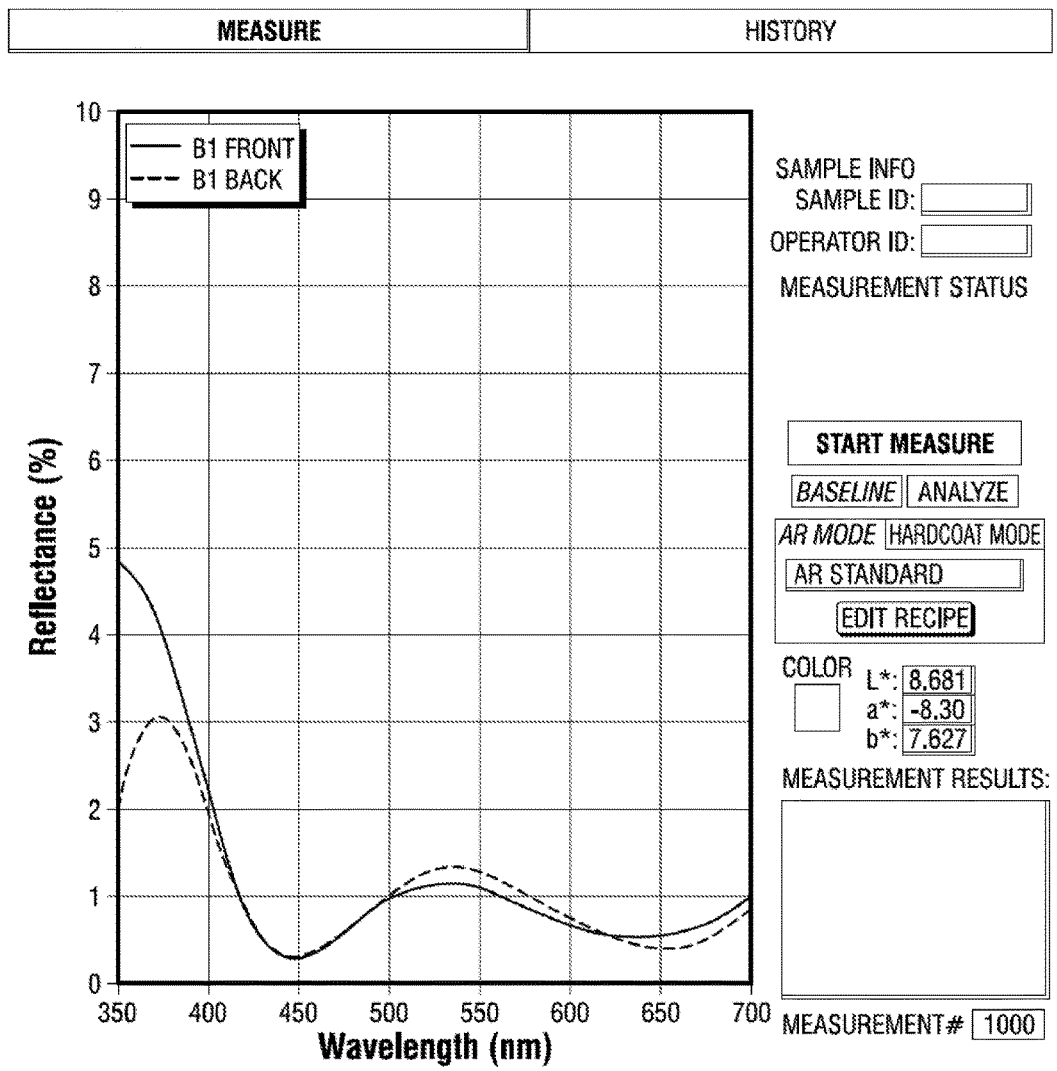
FIG. 5B illustrates a light transmission spectrum chart on which is plotted a baseline AR light spectrum having a wavelength from 350 to 750 nm versus % Reflectance of light waves, in accordance with an illustrative embodiment of the present invention.

FIG. 5A of the drawings illustrates a third system digital display 500 of a typical screen shot of a user interface on an exemplary physical vapor deposition computer system for controlling Samples C1 and C2, showing the thickness of application of HEV light absorbing material 104 on both the front and rear side of the ophthalmic substrate 106. The steps of deposition are listed in real time. The rate at which the HEV light absorbing material 104 is applied is also shown. The light transmission spectrum chart 502 shown in FIG. 5B references the baseline AR light spectrum, the X-axis for wavelength from 350 to 750 nm, and the Y-axis for the % Reflectance of light waves, and specifically blue light waves between about 400 nm and about 460 nm.

Figure 5C:
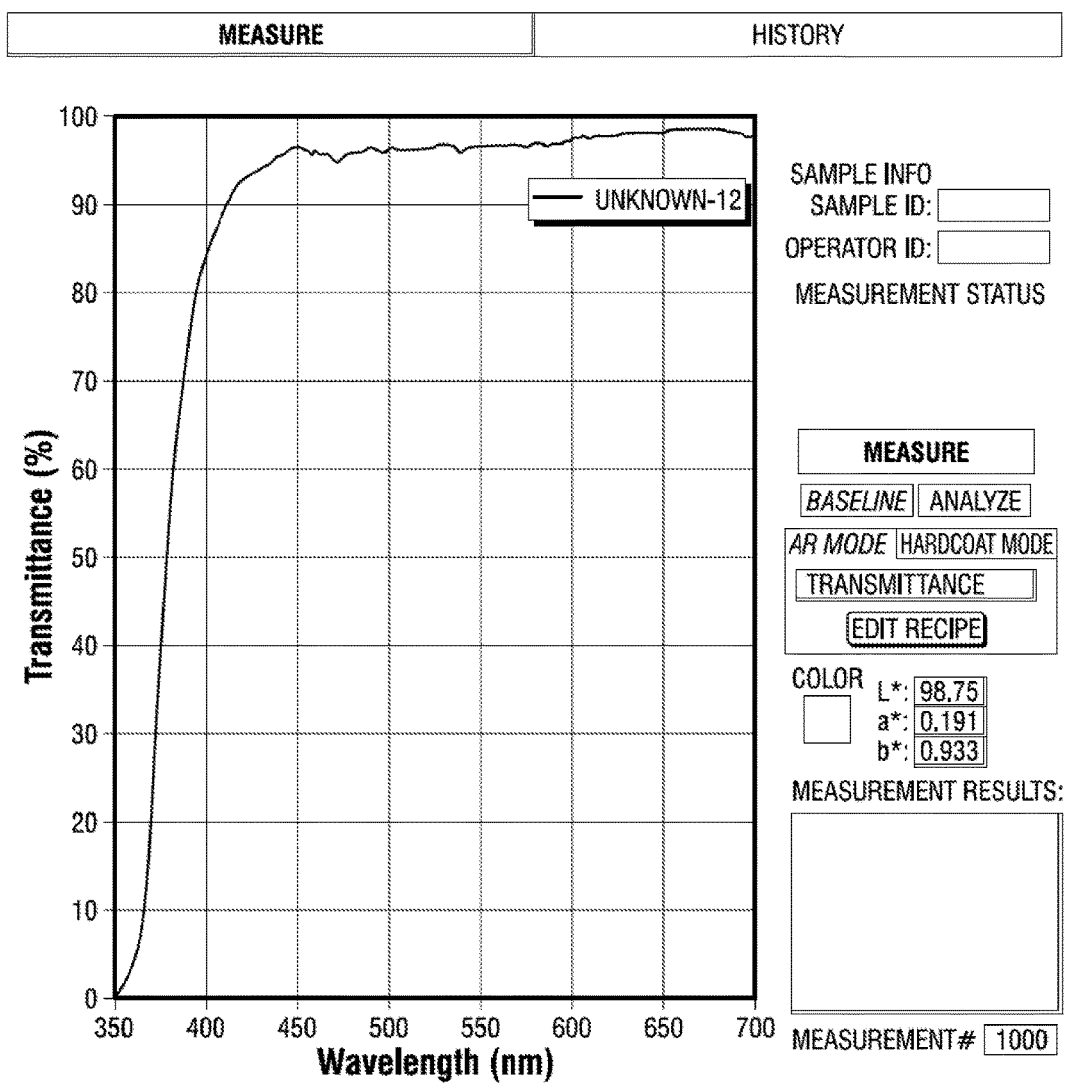
FIG. 5C illustrates a light transmission spectrum chart on which is plotted a baseline AR light spectrum having a wavelength from 350 to 750 nm versus % Transmittance of light waves, in accordance with an illustrative embodiment of the present invention.

FIG. 5C of the drawings illustrates a light transmission spectrum chart 504 on which is plotted a baseline AR light spectrum having a wavelength from 350 to 750 nm versus Transmittance of light waves, in accordance with an illustrative embodiment of the present invention. The light transmission spectrum chart 504 shown in FIG. 5C references the baseline AR light spectrum, the X-axis for wavelength from 350 to 750 nm, and the Y-axis for the % Transmittance of light waves, and specifically blue light waves between about 400 nm and about 460 nm. As shown in Table 100 (FIG. 1A), the absorption of light at 400 nm is 17.3%, whereas the transmission of all light is 95.1%.

Figure 6B:
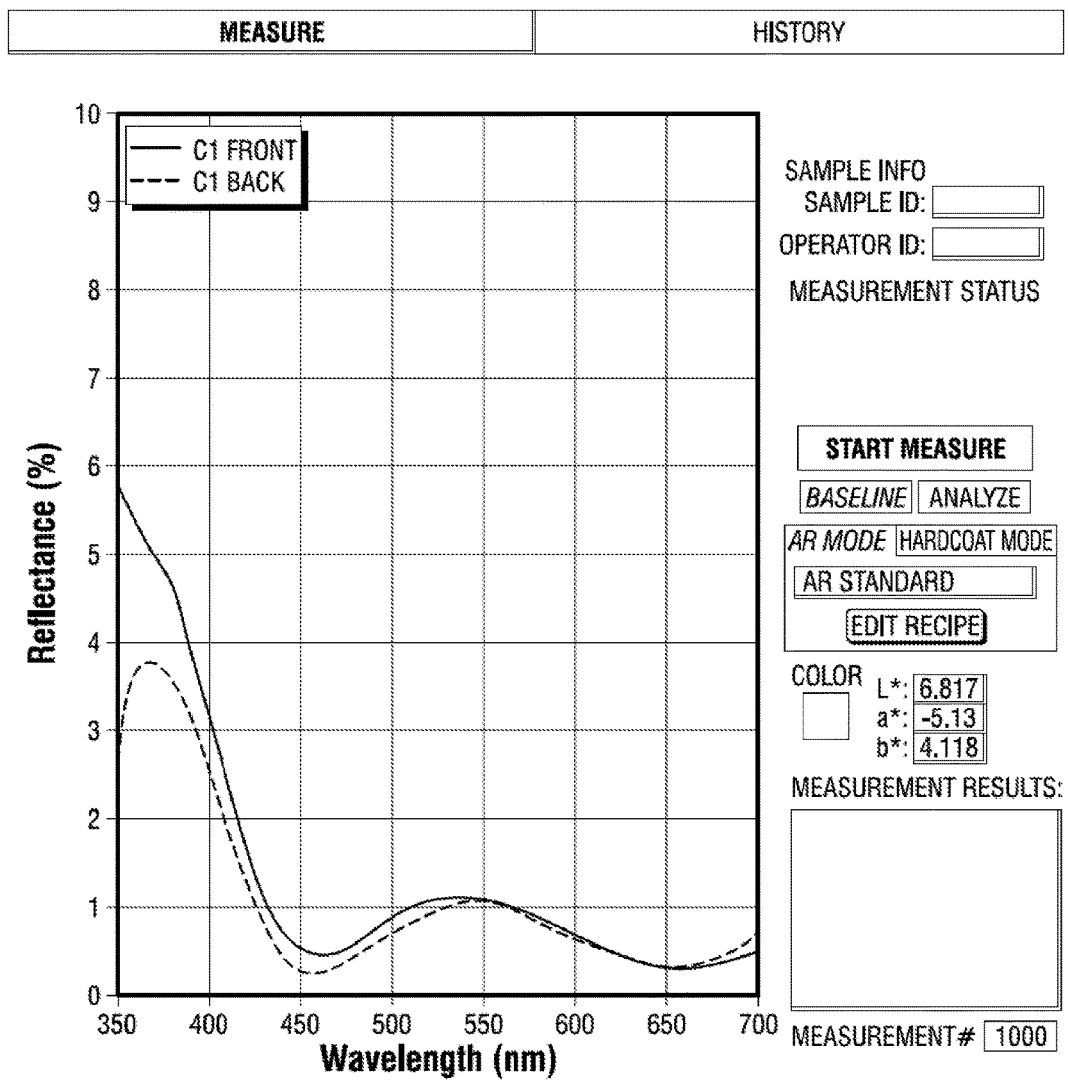
FIG. 6B illustrates a light transmission spectrum chart on which is plotted a baseline AR light spectrum having a wavelength from 350 to 750 nm versus % Reflectance of light waves, in accordance with an illustrative embodiment of the present invention.

FIG. 6A of the drawings is a depiction of the system digital display 600 for controlling Samples D1 and D2, showing the thickness of application of HEV light absorbing material 104 on both the front and rear side of the ophthalmic substrate. The steps of deposition are listed in real time. The rate at which the HEV light absorbing material 104 is applied is also shown. The light transmission spectrum 602 shown in FIG. 6B references the baseline AR light spectrum, the X-axis for wavelength from 350 to 750 nm, and the Y-axis for the % Reflectance of light waves, and specifically blue light waves between about 400 nm and about 460 nm.

Figure 6C:
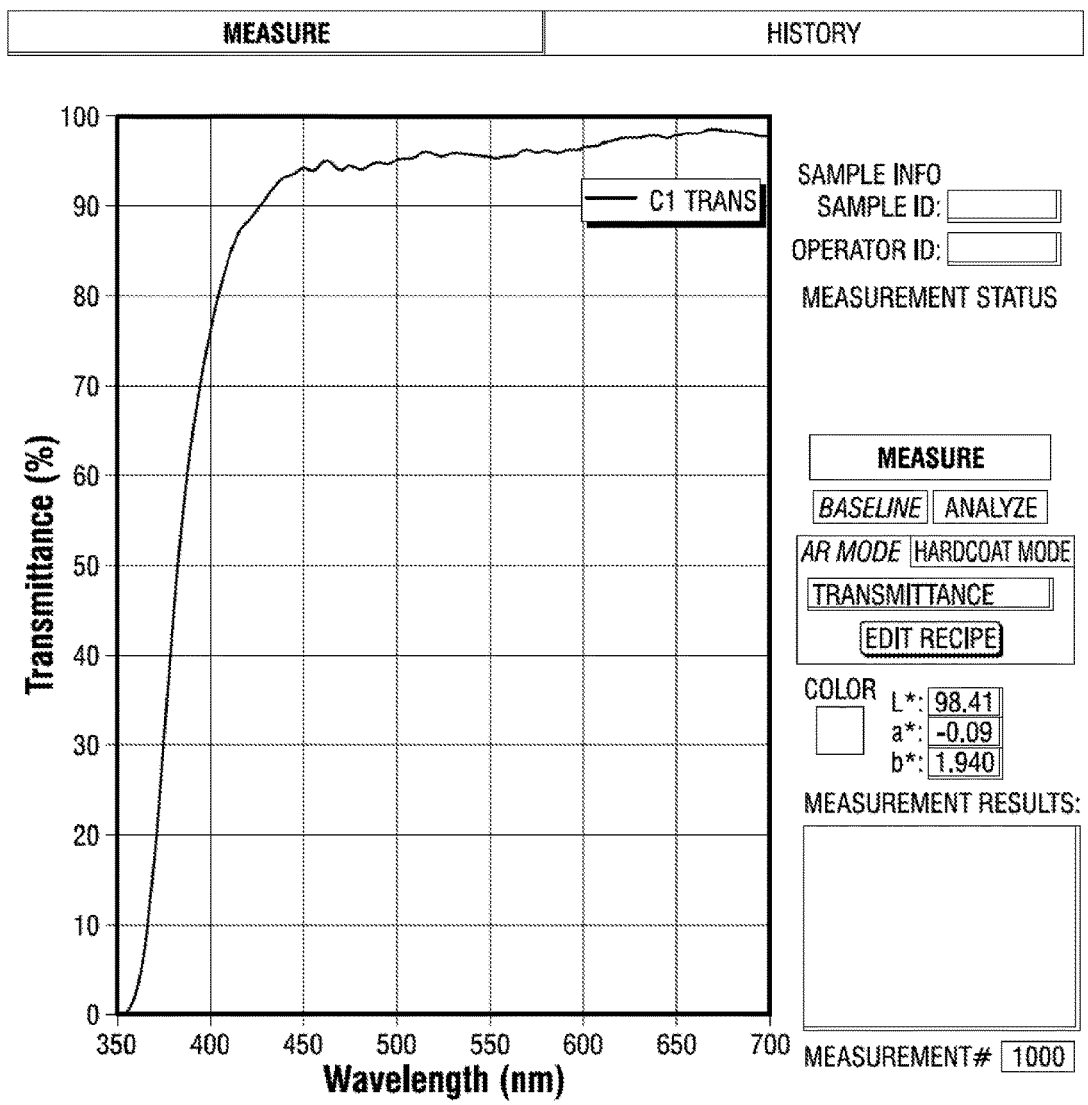
FIG. 6C illustrates a light transmission spectrum chart on which is plotted a baseline AR light spectrum having a wavelength from 350 to 750 nm versus % Transmittance of light waves, in accordance with an illustrative embodiment of the present invention.

FIG. 6C of the drawings illustrates a light transmission spectrum chart 604 on which is plotted a baseline AR light spectrum having a wavelength from 350 to 750 nm versus % Transmittance of light waves, in accordance with an illustrative embodiment of the present invention. The light transmission spectrum chart 604 shown in FIG. 6C references the baseline AR light spectrum, the X-axis for wavelength from 350 to 750 nm, and the Y-axis for the % Transmittance of light waves, and specifically blue light waves between about 400 nm and about 460 nm. As shown in Table 100, the absorption of light at 400 nm is 24.5%, whereas the transmission of all light is 94.4%.

Figure 7B:
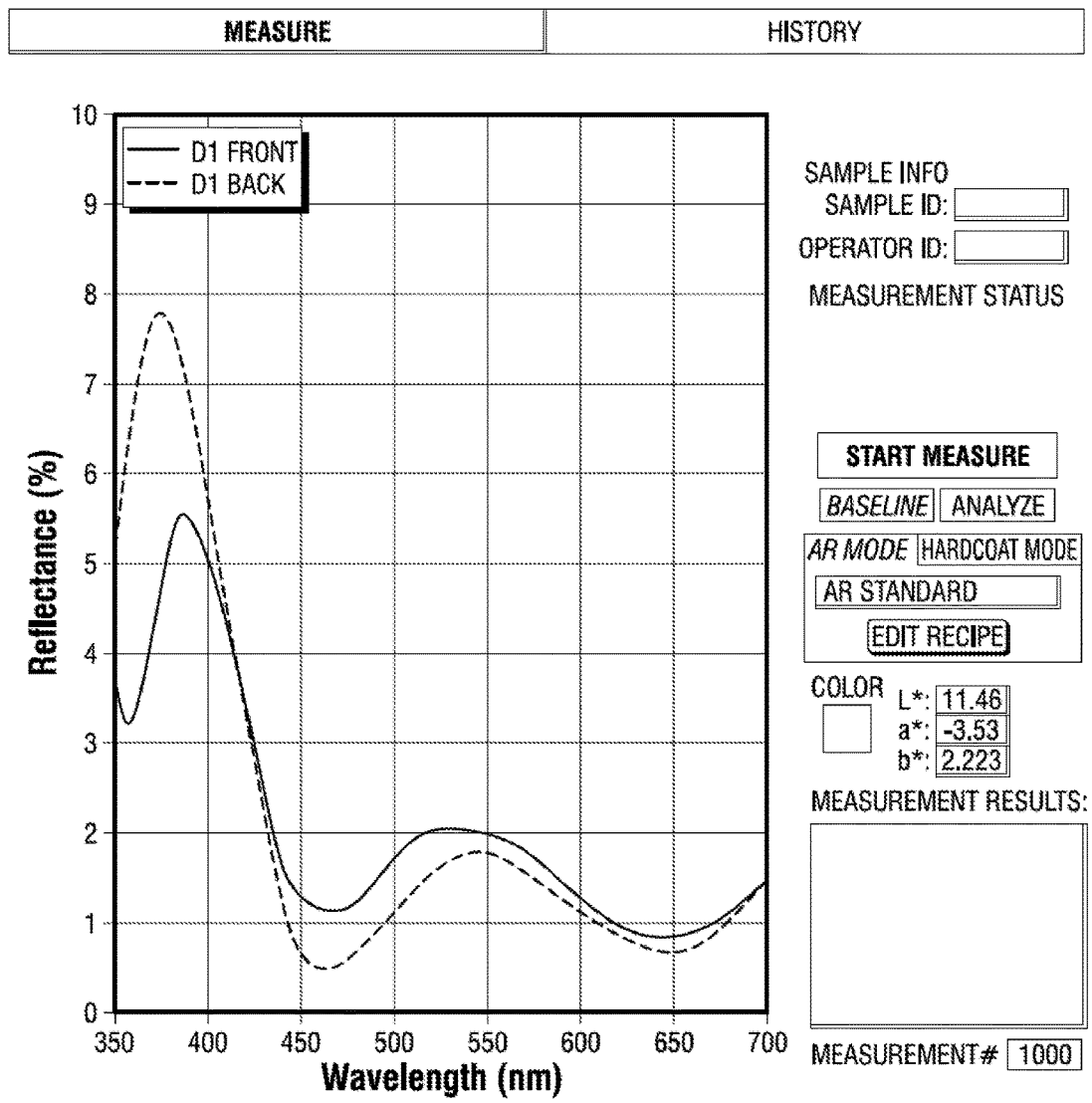
FIG. 7B illustrates a light transmission spectrum chart on which is plotted a baseline AR light spectrum, wavelength from 350 to 750 nm, and % Reflectance of light waves, in accordance with an illustrative embodiment of the present invention.
Figure 7C:
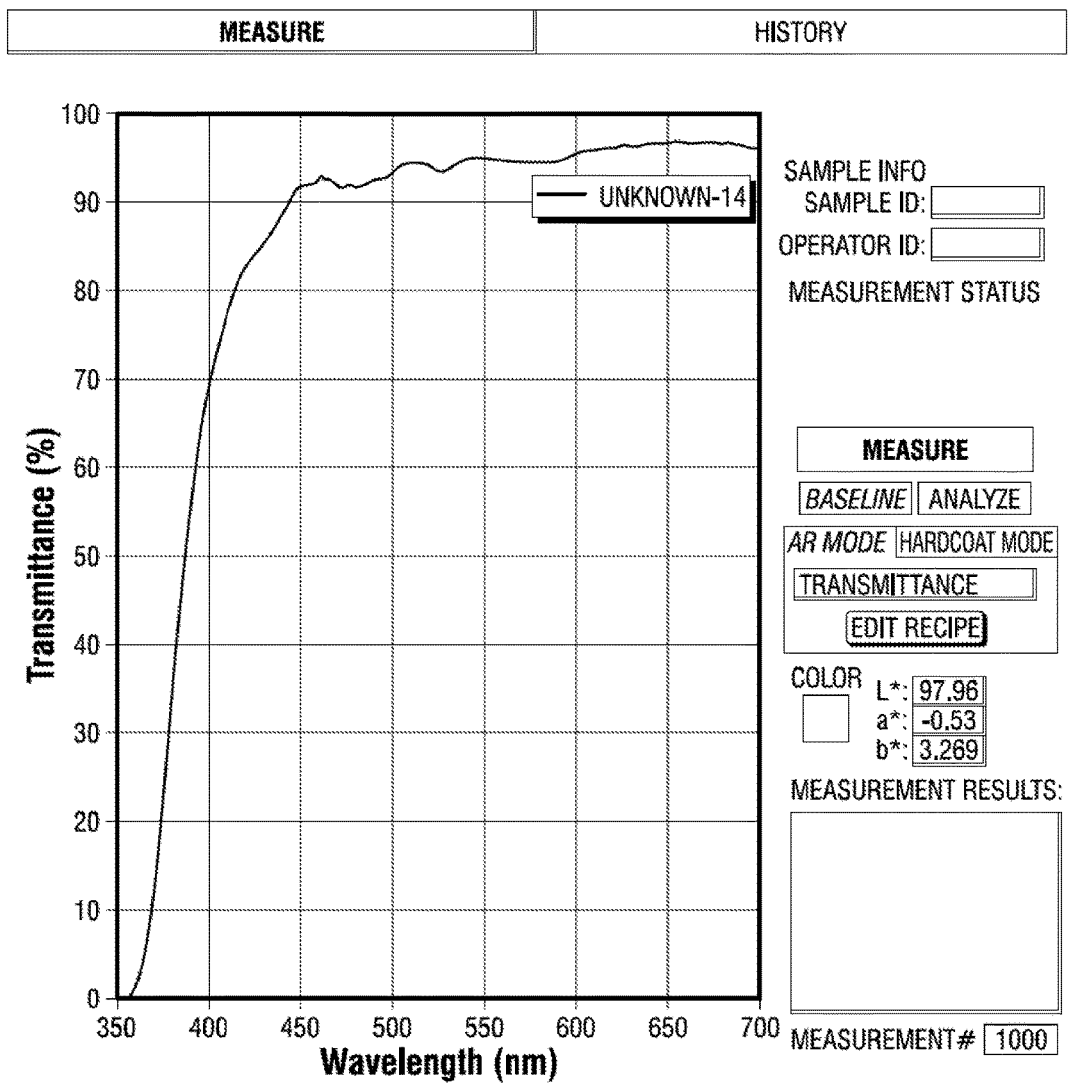
FIG. 7C illustrates a light transmission spectrum chart on which is plotted a baseline AR light spectrum, wavelength from 350 to 750 nm, and % Transmittance of light waves, in accordance with an illustrative embodiment of the present invention.

FIG. 7A of the drawings is a depiction of the fifth system digital display 600 for controlling Samples of HEV light absorbing material 104, showing the thickness of application of HEV light absorbing material 104 on both the front and rear side of the ophthalmic substrate 106. The steps of deposition are listed in real time. The rate at which the HEV light absorbing material 104 is applied is also shown. The light transmission spectrum chart 702 shown in FIG. 7B references the baseline AR light spectrum, the X-axis for wavelength from 350 to 750 nm, and the Y-axis for the % Reflectance of light waves, and specifically blue light waves between about 400 nm and about 460 nm. The light transmission spectrum chart 704 shown in FIG. 7C references the baseline AR light spectrum, the X-axis for wavelength from 350 to 750 nm, and the Y-axis for the % Transmittance of light waves, and specifically blue light waves between about 400 nm and about 460 nm.

Figure 9:
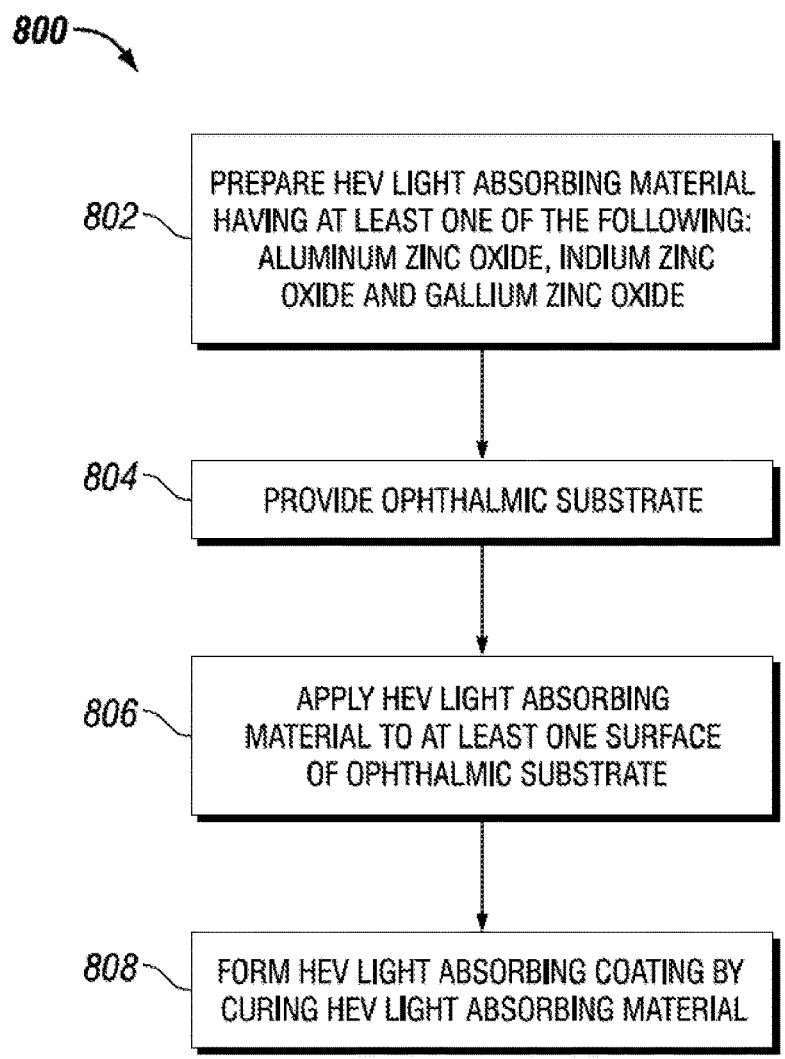
FIG. 9 is a flow diagram which illustrates an application method for an HEV light absorbing material in accordance with an illustrative embodiment of the present invention.

Referring next to FIG. 9 of the drawings, a flow diagram 900 illustrates an application method for an HEV light absorbing material in accordance with an illustrative embodiment of the present invention. At Step 902, an HEV light absorbing material may be prepared. The HEV light absorbing material may include at least one of the following: aluminum zinc oxide, indium zinc oxide and gallium zinc oxide.

At Step 904, an ophthalmic substrate may be provided.

At Step 906, the HEV light absorbing material prepared at Step 902 may be applied to at least one surface of the ophthalmic substrate. In some embodiments, the HEV light absorbing material may be applied to an exterior substrate surface of the ophthalmic substrate. In other embodiments, the HEV light absorbing material may be applied to an interior substrate surface of the ophthalmic substrate. In still other embodiments, the HEV light absorbing material may be applied to both the exterior substrate surface and the interior substrate surface of the ophthalmic substrate. In yet other embodiments, the HEV light absorbing material may be applied to an antireflective coating which was previously applied to the ophthalmic substrate. In some embodiments, the HEV light absorbing material may be combined with chemical elements and/or compounds which are commonly used in the design of antireflective coatings prior to application of the HEV light absorbing material to the ophthalmic substrate to render the resulting HEV light absorbing coating antireflective.

At Step 908, an HEV light absorbing coating may be formed on the ophthalmic substrate by curing the HEV light absorbing material typically using conventional curing techniques and parameters.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A high energy visible light absorbing coating for an ophthalmic substrate, the high energy visible light absorbing coating comprising:
a high energy visible light absorbing material comprising at least one of the following: aluminum zinc oxide, indium zinc oxide and gallium zinc oxide, the high energy visible light absorbing material selectively absorbing light within a wavelength range of the light spectrum of between about 350 nm and about 460 nm, the high energy visible light absorbing material enabling transmission of at least 98 percent of light outside the wavelength range of the light spectrum of between about 350 nm and about 460 nm, the high energy visible light absorbing material further being generally antireflective, the high energy visible light absorbing material forming a high energy visible light absorbing coating with a layer thickness of from about 33 nm to about 117 nm.

2. The high energy visible light absorbing coating of claim 1 wherein the high energy visible light absorbing material selectively absorbs light within a wavelength range of the light spectrum between about 400 nm and about 460 nm.

3. The high energy visible light absorbing coating of claim 1 wherein the high energy visible light absorbing material comprises at least two of the following: aluminum zinc oxide, indium zinc oxide and gallium zinc oxide.

4. The high energy visible light absorbing coating of claim 3 wherein the high energy visible light absorbing material comprises aluminum zinc oxide, indium zinc oxide and gallium zinc oxide.

5. The high energy visible light absorbing coating of claim 1 wherein the high energy visible light absorbing material is integrated into an antireflective coating.

6. The high energy visible light absorbing coating of claim 5 wherein the antireflective coating comprises at least one of the following: $SiO_2$, $MgF_2$, $ZrO_2$, $TiO_2$, and $Ta_3O_5$.

7. The high energy visible light absorbing coating of claim 1 wherein the high energy visible light absorbing material is deposited through physical vapor deposition.

8. The high energy visible light absorbing coating of claim 7 wherein the physical vapor deposition includes known methods of magnetron sputtering and e-beam evaporation.

9. A high energy visible light absorbing coating for an ophthalmic substrate, the high energy visible light absorbing coating comprising:
a high energy visible light absorbing material comprising at least one of the following: aluminum zinc oxide, indium zinc oxide and gallium zinc oxide, the high energy visible light absorbing material selectively absorbing light within a wavelength range of the light spectrum of between about 400 nm and about 460 nm, the high energy visible light absorbing material enabling transmission of at least 98 percent of light outside the wavelength range of the light spectrum of between about 350 nm and about 460 nm, the high energy visible light absorbing material further being generally antireflective, the high energy visible light absorbing material forming a high energy visible light absorbing layer with a coating thickness of from about 33 nm to about 117 nm.

10. The high energy visible light absorbing coating of claim 9 wherein the high energy visible light absorbing material comprises at least two of the following: aluminum zinc oxide, indium zinc oxide and gallium zinc oxide.

11. The high energy visible light absorbing coating of claim 9 wherein the high energy visible light absorbing material comprises aluminum zinc oxide, indium zinc oxide and gallium zinc oxide.

12. The high energy visible light absorbing coating of claim 9 wherein the high energy visible light absorbing material is integrated into an antireflective coating.

13. The high energy visible light absorbing coating of claim 12 wherein the antireflective coating comprises at least one of the following: $SiO_2$, $MgF_2$, $ZrO_2$, $TiO_2$, and $Ta_3O_5$.

14. The high energy visible light absorbing coating of claim 9 wherein the high energy visible light absorbing material is deposited through physical vapor deposition.

15. The high energy visible light absorbing coating of claim 14 wherein the physical vapor deposition includes known methods of magnetron sputtering and e-beam evaporation.

16. An application method for a high energy visible light absorbing material, comprising:
providing a high energy visible light absorbing material having gallium zinc oxide;
providing an ophthalmic substrate;
applying the high energy visible light absorbing material to the ophthalmic substrate; and
forming a high energy visible light absorbing coating on the ophthalmic substrate by depositing the high energy light absorbing material, the high energy visible light absorbing coating selectively absorbing light within a wavelength range of the light spectrum of between about 350 nm and about 460 nm, the high energy visible light absorbing coating enabling transmission of at least 98 percent of light outside the wavelength range of the light spectrum of between about 350 nm and about 460 nm, the high energy visible light absorbing coating having a layer thickness of from about 33 nm to about 117 nm.

17. The application method of claim 16 wherein applying the high energy visible light absorbing material to the ophthalmic substrate comprises applying the high energy visible light absorbing material to an exterior surface of the ophthalmic substrate.

18. The application method of claim 16 wherein providing a high energy visible light absorbing material having at least one of the following: aluminum zinc oxide, indium zinc oxide and gallium zinc oxide comprises providing a high energy visible light absorbing material having aluminum zinc oxide, indium zinc oxide and gallium zinc oxide.

19. The application method of claim 16 wherein providing an ophthalmic substrate comprises providing an ophthalmic substrate having an antireflective coating and applying the high energy visible light absorbing material to the ophthalmic substrate comprises applying the high energy visible light absorbing material to the antireflective coating.

20. The application method of claim 16 wherein applying the high energy visible light absorbing material to the ophthalmic substrate comprises applying the high energy visible light absorbing material to the ophthalmic substrate through physical vapor deposition.

\* \* \* \* \*